United States Patent [19]

Caroleo et al.

[11] 4,398,754
[45] Aug. 16, 1983

[54] ELECTRICALLY INSULATED PIPE COUPLING AND METHOD FOR MAKING THE SAME

[75] Inventors: Steven J. Caroleo, McKees Rocks; Edward L. Schmitt, Pittsburgh, both of Pa.

[73] Assignee: Kerotest Manufacturing Corp., Pittsburgh, Pa.

[21] Appl. No.: 177,236

[22] Filed: Aug. 11, 1980

[51] Int. Cl.³ ............................................. F16L 55/00
[52] U.S. Cl. ...................................... 285/45; 285/53;
 285/107; 285/334.2; 285/334.3; 285/334.4;
 285/383; 285/369; 285/423; 285/DIG. 16;
 156/293; 156/294
[58] Field of Search ................... 285/355, 53, 50, 54,
 285/369, 334.2, 383, 334.3, DIG. 20, 334.4,
 DIG. 16, 423, 293, 107; 156/293, 294

[56] References Cited

U.S. PATENT DOCUMENTS

| | | | |
|---|---|---|---|
| 278,800 | 6/1883 | Kline | 285/355 |
| 1,856,415 | 5/1932 | Halperin et al. | 285/53 X |
| 2,924,546 | 2/1960 | Shaw | 285/293 X |
| 3,266,821 | 8/1966 | Safford | 285/383 X |
| 3,453,006 | 7/1969 | Levake | 285/423 X |
| 3,462,175 | 8/1969 | Johnson | 285/53 |
| 3,558,164 | 1/1971 | Hovell | 285/423 X |
| 3,614,137 | 10/1971 | Jacobson | 285/423 |
| 3,686,747 | 8/1972 | Bagnulo | 29/508 |
| 3,705,735 | 12/1972 | Davidson et al. | 285/53 |
| 3,871,687 | 3/1975 | Dockree | 285/53 |
| 3,993,331 | 11/1976 | Schwarz | 285/53 |
| 4,011,652 | 3/1977 | Black | 29/455 R |
| 4,066,283 | 1/1978 | Struck | 285/53 |
| 4,147,381 | 4/1979 | Schwarz | 285/53 |
| 4,229,028 | 10/1980 | Gray | 285/383 |
| 4,296,954 | 10/1981 | Fujimaki et al. | 285/355 X |

Primary Examiner—Dave W. Arola
Attorney, Agent, or Firm—Stanley J. Price, Jr.; John M. Adams

[57] ABSTRACT

A connection between two pipes of a pipeline includes a pair of coupling members having externally threaded ends with sealing surfaces projecting from the ends. The threaded ends are advanced into opposite ends of an insulating sleeve fabricated of electrically nonconductive material. Internally threaded end portions of the sleeve are separated by an annular recessed portion. A resilient, nonconductive annular spacer is retained within the annular recessed portion. The spacer includes a pair of inclined inner sealing surfaces positioned in overlying sealing relation with the coupling member sealing surfaces and an outer sealing surface sealingly engaging the insulating sleeve to form a fluid and pressure tight seal around the annular space between the coupling members and the insulating sleeve in addition to electrically insulating the coupling members from each other. Upon the application of internal fluid pressure within the coupling members the sealing surfaces of the annular spacer are wedged into increasing sealing engagement with the coupling member sealing surfaces and the insulating sleeve so that the sealing forces generated between the respective components increase proportionally with an increase in the pipeline pressure.

12 Claims, 6 Drawing Figures

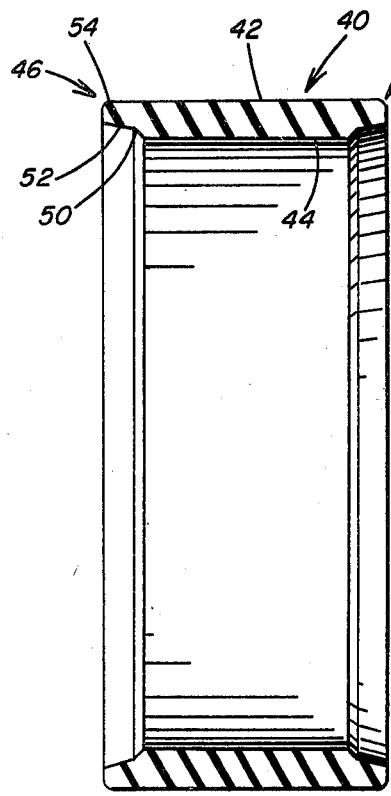
FIG. 2
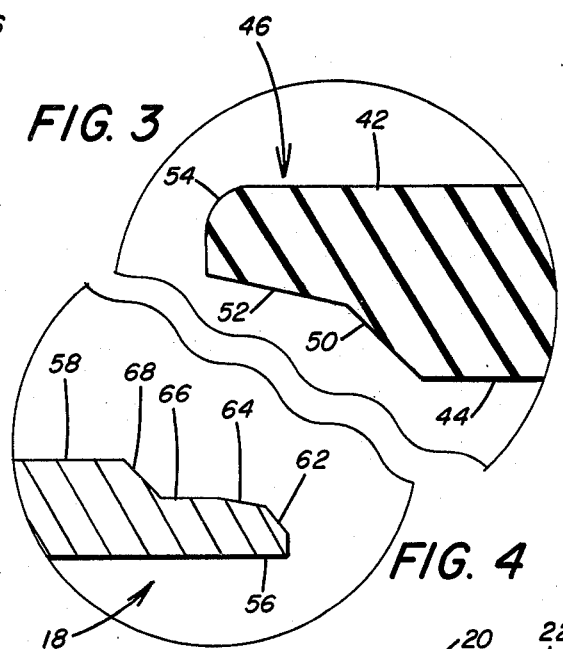
FIG. 3
FIG. 4
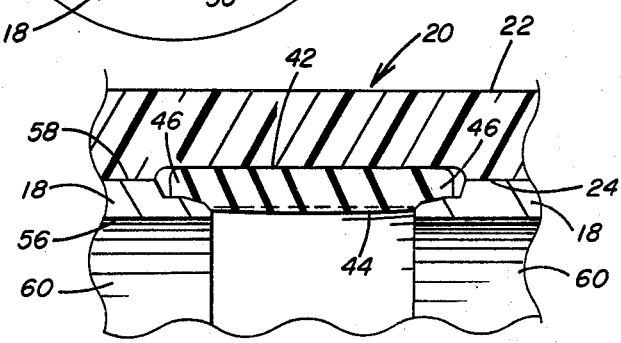
FIG. 5
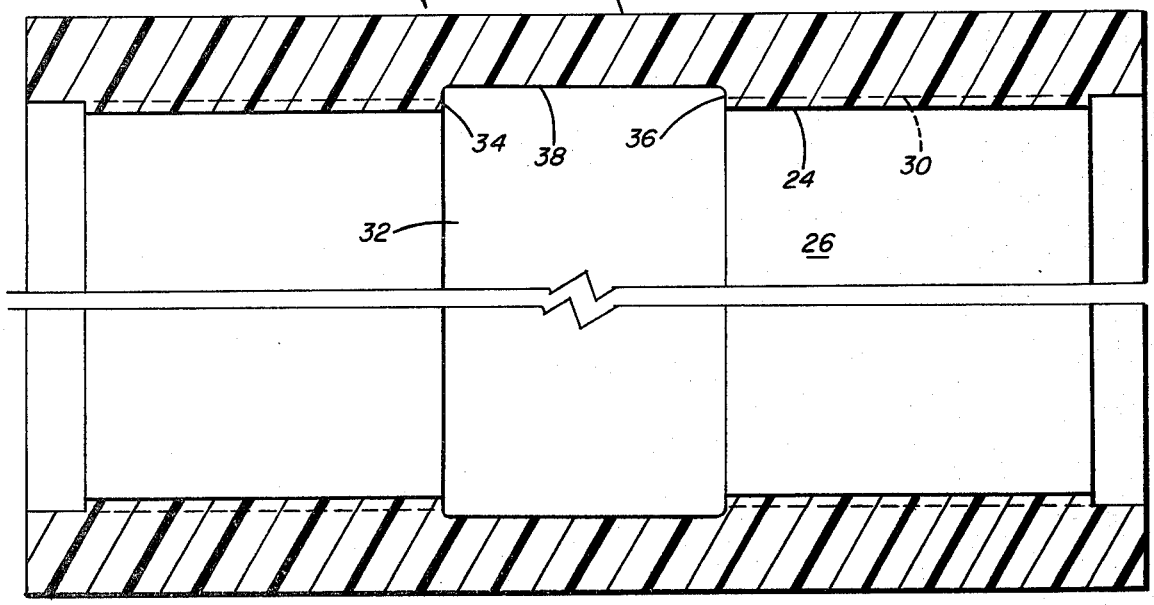
FIG. 6

ELECTRICALLY INSULATED PIPE COUPLING AND METHOD FOR MAKING THE SAME

BACKGROUND OF THE INVENTION

1. Field of the Invention

This invention relates to an electrically insulated pipe coupling and method for making the same and more particularly to a high pressure pipe coupling having components engaged in sealing relation by contact of sealing surfaces that increases the seal forces upon an increase in the pipeline pressure.

2. Description of the Prior Art

It is well known in the art to connect pipes of a pipeline, for example a main gas transmission line to a branch gas transmission, by an electrically insulated coupling. In order to cathodically protect the main or branch lines from the flow of current between the connected lines and to prevent rusting of the pipe, electrical insulation must be provided between the main line and the branch lines. The insertion of an annular insulator between the spaced apart pipes with an insulating sleeve surrounding the pipes and the insulator is a well known method of completing an insulated pipe coupling as disclosed in U.S. Pat. No. 4,011,652.

The coupling while serving to insulate one coupling member from another must also resist corrosive damage by the entrance of moisture into the coupling members. In most cases fluid transmission lines, such as a gas pipeline, are located underground where the lines are subjected to a corrosive environment. Unless the coupling members that connect the pipelines are connected in a manner to resist the entrance of moisture into the coupling members and the coupling threads, moisture will promote rust of the coupling members. Thread corrosion is generally the principal cause of leaks in underground, coupled pipelines.

It is the conventional practice to enclose the spaced apart electrically insulated coupling end portions of the pipeline connection in an insulating sleeve. The sleeve overlaps the annular insulator and the coupling end portions. The sleeve must be securely retained on the coupling end portions and a fluid tight seal maintained between the sleeve and the coupling end portions. One approach that has been suggested to sealingly engage the sleeve to the coupling end portions is the provision of annular beads on the coupling members anchored in sockets of the sleeve, as disclosed in U.S. Pat. No. 3,993,331.

A similar approach is the use of O-rings between the coupling members and the sleeve as disclosed in U.S. Pat. Nos. 3,871,687 and 4,147,381. U.S. Pat. No. 4,147,381 also discloses a sleeve having a plurality of ribs engaging complimentary grooves on the coupling members. It has also been suggested to adhesively bond the abutting surfaces of the sleeve and coupling members together.

A problem common to above methods of sealingly connecting the insulating sleeve to the coupling members is maintaining a seal around the annular insulator for a wide range of fluid pressures, both liquid and gas, through the coupling. There is also encountered the problem of preventing leakage through the insulating sleeve due to the porous nature of pressure carrying members constructed by the filament winding process. Under high pressures as encountered particularly in gas transmission lines, O-ring seals are subject to distortion and leakage of fluid around the annular insulator and between the sleeve and the coupling members. Also connections made by complimentary engaging surfaces of the sleeve and coupling members must be initially designed to withstand the maximum fluid pressure permitted in the pipeline. Consequently, the known pipeline couplings which possess a high insulating value and adequate strength to withstand high pressures are expensive to make and are complex to assemble.

Therefore, there is need in high pressure pipelines requiring an insulated coupling for connecting pipes, a coupling that is efficiently and inexpensively assembled to provide a fluid tight seal between the coupling members for a wide range of fluid pressures.

SUMMARY OF THE INVENTION

In accordance with the present invention there is provided an electrically insulated pipe coupling that includes a first coupling member and a second coupling member. The first and second coupling members are positioned in axial alignment and include oppositely positioned end portions spaced from one another. The oppositely positioned end portions each have an annular sealing surface. An insulating sleeve surrounds the coupling member end portions to connect the first and second coupling members in spaced relation. The insulating sleeve has an inner annular recessed portion. A resilient annular spacer is retained in the insulating sleeve recessed portion between the coupling member end portions. The annular spacer has an outer surface and an inner surface. The annular spacer includes end portions overlapping the coupling member end portions and the outer surface abuts the insulating sleeve. The annular spacer end portions have a plurality of inclined inner sealing surfaces on the inner surface and an outer sealing surface on the outer surface. The coupling member end portions are axially advanced into the opposite ends of the insulated sleeve. The coupling member annular sealing surfaces are urged into sealing contact with the annular spacer inclined sealing surfaces thereby urging the annular spacer outer sealing surface into sealing contact with the insulating sleeve to form a fluid tight seal between the coupling member end portions and the insulating sleeve.

Preferably, the annular sealing surface formed on the end of each coupling member includes a plurality of inclined surfaces extending at preselected angles so that a plurality of surfaces are provided on the end of each coupling member and are adapted to sealingly engage in a complimentary manner the inclined inner sealing surfaces of the annular spacer.

The coupling members are externally threaded adjacent the oppositely positioned end portions. The insulating sleeve has an internally threaded passageway formed on opposite sides of the inner annular recessed portion. This arrangement permits threaded advancement of the coupling members into the insulating sleeve. The coupling member annular sealing surfaces are urged into sealing contact with the annular spacer inclined inner sealing surfaces upon threaded advancement of the first and second coupling members into opposite ends of the insulating sleeve. The annular sealing surfaces of the coupling members upon axial advancement of the coupling members in the insulating sleeve engage the complimentary annular spacer inclined inner sealing surfaces to expand the spacer radially outwardly and thereby urge the annular spacer outer sealing surface into sealing contact with the insulating sleeve. This arrangement provides a fluid tight seal between the first and second coupling members in the insulating sleeve. The sealing forces generated between the respective coupling members and the insulating sleeve increase proportionally with an increase in pressure of the fluid transmitted through the pipe coupling and pipelines to which the coupling is connected. This arrangement assures a fluid tight seal between the coupling members for high pressure pipelines.

Further in accordance with the present invention there is provided a method for making an electrically insulated pipe coupling that includes the step of forming an annular sealing surface on the end of a first coupling member and the end of a second coupling member. An annular spacer having a plurality of inclined inner sealing surfaces and an outer sealing surface is retained within an insulating sleeve intermediate the end portions of the sleeve. The end portions of the first and second coupling members are inserted into opposite ends of the insulating sleeve. The coupling member annular sealing surfaces are advanced into compressing, sealing relation with the annular spacer inclined inner sealing surfaces. The outer peripheral surface of the annular spacer is compressed outwardly into sealing relation with the insulating sleeve. The annular spacer outer sealing surface is urged into sealing engagement with the insulating sleeve to form a fluid and pressure tight seal around the annular spacer between the coupling members and the insulating sleeve and to electrically insulate the first and second coupling members from each other.

Accordingly, the principal object of the present invention is to provide an electrically insulated pipe coupling for joining together pipes of a transmission pipeline by a pair of coupling members connected together in spaced relation by sealing engagement of an annular spacer with complimentary sealing surfaces provided on the ends of the coupling members and an insulating sleeve surrounding the connection of the coupling members.

Another object of the present invention is to provide an inexpensively and efficiently assembled insulated pipe coupling where the seal between the coupling members and a surrounding insulating sleeve is completed upon advancement of the coupling members into sealing engagement with a resilient annular spacer retained within the insulating sleeve and separating the adjacent ends of the coupling members where the sealing force exerted between the resilient annular spacer and the respective coupling members and the insulating sleeve increases with an increase in the fluid pressure in the coupling.

A further object of the present invention is to provide a method for making an electrically insulated pipe coupling that insures a fluid tight seal between the coupling members and the surrounding insulating seal for high pressure pipelines.

These and other objects of the present invention will be more completely described in the following specification, the accompanying drawings, and the appended claims.

BRIEF DESCRIPTION OF THE DRAWINGS

FIG. 2 is an enlarged sectional view in side elevation of the resilient annular spacer, illustrating the sealing surfaces of the spacer.

FIG. 3 is an enlarged fragmentary sectional view of the resilient annular spacer shown in FIG. 2, illustrating the inner inclined sealing surfaces and the outer radial sealing surface of the spacer.

FIG. 4 is an enlarged fragmentary sectional view of the end of one of the coupling members, illustrating the sealing surfaces for engaging the complimentary sealing surfaces of the annular spacer.

FIG. 5 is an enlarged fragmentary sectional view of the sealing engagement of the coupling resilient annular spacer with the coupling member end portions and the surrounding insulating sleeve formed upon the initial insertion of the coupling members into the insulating sleeve.

FIG. 6 is an enlarged sectional view of the insulating sleeve, illustrating a passageway having internally threaded portions separated by a smooth, annular recessed portion.

DESCRIPTION OF THE PREFERRED EMBODIMENT

Figure 1:
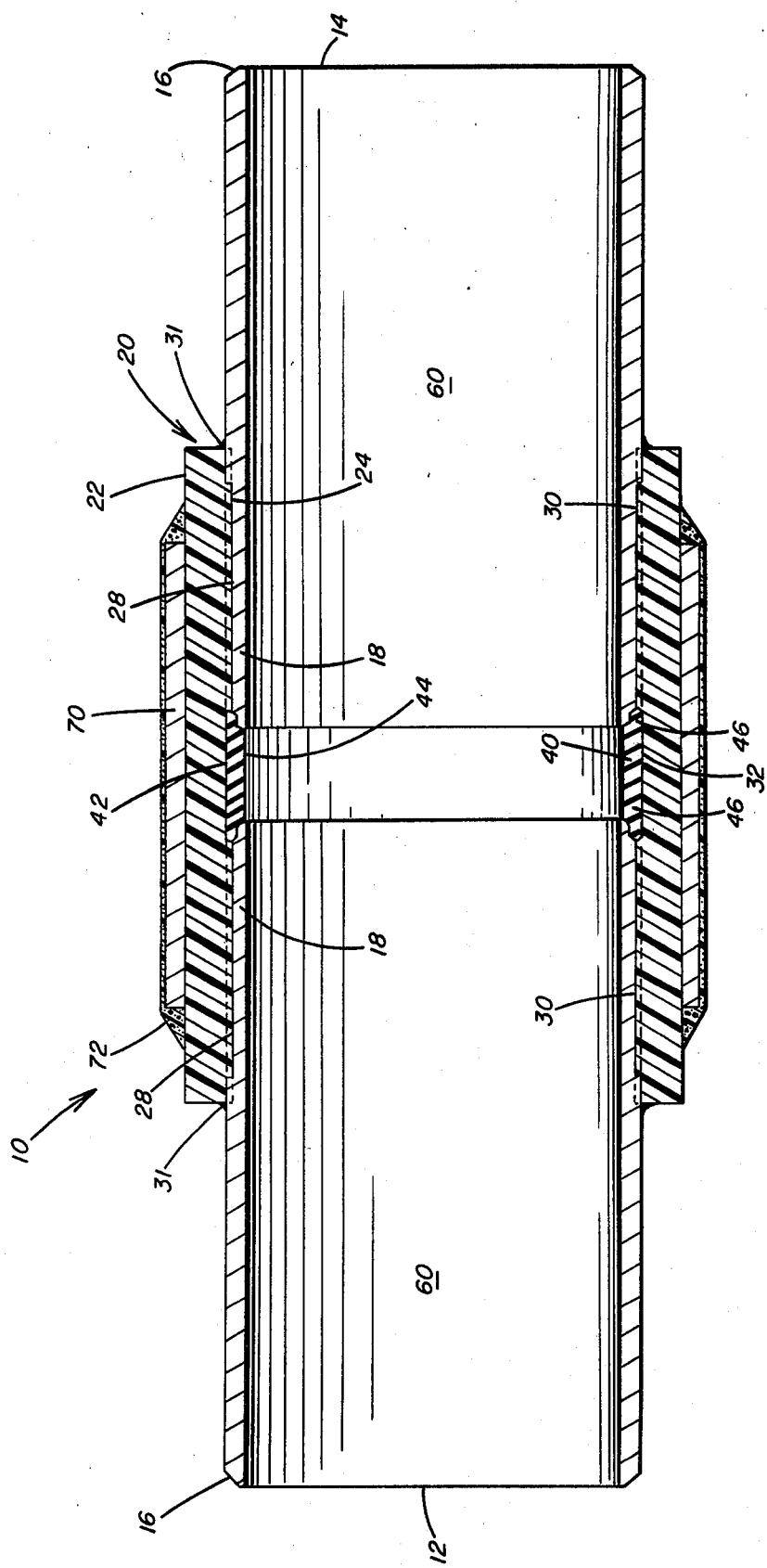
FIG. 1 is an enlarged sectional view in side elevation of a pipe coupling for joining the pipes of a pipeline, illustrating a resilient annular spacer retained within an insulating sleeve and sealingly engaging spaced apart end portions of the coupling members and the insulating sleeve.

Referring to the drawings and particularly to FIG. 1, there is illustrated an electrically insulated pipe coupling generally designated by the numeral 10 for connecting the ends of pipes to complete a pipeline where, for example, the pipe coupling 10 connects a main gas transmission line to a branch gas transmission line. The pipe coupling 10 connects the pipes of the pipeline in a manner to cathodically protect the main gas transmission line and the branch gas transmission line from the flow of current between the connected lines and to prevent rusting of the coupling connecting the main line to the branch line.

The pipe coupling 10 includes a first coupling member or pipe section 12 and a second coupling member or pipe section 14. Each coupling member 12 and 14 includes a first end portion 16 suitably machined to facilitate butt welding or seam welding of the respective coupling member end portion 16 to a pipe (not shown) of the pipeline so that the pipes are electrically insulated by the pipe coupling 10 in accordance with the present invention. Preferably, the pipes of the pipeline have the same cross section as the coupling members 12 and 14. Each of the coupling members 12 and 14 also includes a second end portion 18 where the end portions 18 of the first and second couplings 12 and 14 are oppositely positioned in spaced axial alignment within an insulating sleeve generally designated by the numeral 20.

The insulating sleeve 20 surrounds and connects the couplings 12 and 14 in spaced relation. The insulating sleeve 20 has an outer cylindrical surface 22 and an inner cylindrical surface 24 thereby forming a passageway 26 as illustrated in FIG. 6 for receiving the coupling member end portions 18 as illustrated in FIG. 1. The insulating sleeve 20 is fabricated of an insulative material having good electrical insulating properties. Preferably the sleeve 20 is fabricated of glass fibre reinforced with a thermosetting resin, e.g. an epoxy resin, reinforced by embedded glass fibers or similar filaments as well known in the art.

Preferably, the end portions 18 of the coupling members 12 and 14 have an externally threaded portion 28, and the insulating sleeve 20 is provided with internally threaded portions 30 surrounding the passageway 26. Prior to assembly of the coupling 10, the coupling threaded portions 28 are coated with a suitable bonding material, e.g. an epoxy resin. The coupling threaded end portions 28 are then threadedly advanced into engagement with the insulating sleeve internally threaded portions 30 prior to curing of the resin. Once the resin cures between the engaged threaded portions 28 and 30, the threaded portions 28 and 30 are bonded together to prevent their separation. This arrangement also serves to seal the threaded engagement of the coupling members 12 and 14 to the sleeve 20. In addition an epoxy seal may be positioned around the ends of the sleeve 20 on the coupling members 12 and 14 as illustrated by the seal 31 illustrated in FIG. 1.

The internally threaded portions 30 of the sleeve 20 are separated from one another by an inner annular recessed portion 32. Preferably, the diameter of the annular recessed portion 32 is greater than the diameter of the threaded portions 30 of the passageway 26 thereby forming shoulders 34 and 36 on the interior of the insulating sleeve 20 separating the threaded portions 30 from a smooth annular surface 38 formed by the recessed portion 32.

As further illustrated in FIG. 1, a resilient annular spacer 40 is retained in the insulating sleeve recessed portion 32 between the coupling member end portions 18. The resilient annular spacer 40 is illustrated in greater detail in FIGS. 2 and 3. Preferably, the annular spacer 40 is a molded member capable of being compressed and retaining its original configuration after compressive forces are released. The annular spacer may be fabricated of a resilient material selected from the group consisting of epoxy resins, polyurethane, silicone elastomers, fluorosilicone rubber, polyethylene, polypropylene, or fluoroethylene/propylene.

The annular spacer 40 has an outer cylindrical surface 42 which serves as an outer peripheral sealing surface of the spacer 40 as will be explained later in greater detail and an inner cylindrical surface 44. Further the spacer 40 includes opposite end portions generally designated by the numeral 46 in FIGS. 2 and 3 that are arranged to overlap in sealing engagement the respective coupling member end portions 18, as illustrated in FIG. 1 and further in greater detail in FIG. 5. The outer cylindrical surface 42 abuts the insulating sleeve annular surface 38.

The spacer end portions 46, as illustrated in FIG. 3, have a plurality of inclined inner sealing surfaces 50 and 52 adjacent the inner cylindrical surface 44 and an outer sealing surface 54 that is positioned adjacent and formed integral with the outer cylindrical surface 42. The inner sealing surface 50 extends at a preselected angle, for example 45°, from the inner cylindrical surface 44. The inner sealing surface 52 projects axially and upwardly from the inner sealing surface 50 at a preselected angle, as for example 12°, from a horizontal plane extending axially from the point of intersection of the sealing surfaces 50 and 52. The outer sealing surface 54 connects the inner sealing surface 52 with the outer cylindrical surface 42 of the spacer 40.

As illustrated in FIG. 3, the outer sealing surface 54 has a preselected radius so as to provide a transition of the outer sealing surface 54 to the inner sealing surface 52. Also the outer cylindrical surface 42 of the spacer 40 forms a continuous outer peripheral sealing surface that extends from the sealing surface 54 positioned at one end of the spacer 40 to the sealing surface 54 positioned at the opposite end of the spacer 40. This outer peripheral sealing surface contacts along its entire length the smooth annular surface 38 formed by the insulating sleeve recessed portion 32.

The respective sealing surfaces 50 and 52 of the resilient annular spacer 40 are arranged to engage complimentary sealing surfaces of the coupling member end portions 18 and the outer sealing surface 54 is arranged to sealingly engage the insulating sleeve 20. The sealing surfaces of the coupling member end portions 18 are shown in greater detail in FIG. 4 which illustrates a coupling member end portion 18 which is representative of the end portion 18 of each coupling member 12 and 14 illustrated in FIG. 1.

Referring to FIG. 4, each of the coupling members 12 and 14 includes an inner cylindrical wall 56 and an outer cylindrical wall 58 thereby forming a passageway 60 through which fluid from the pipe connected to the first coupling member 12 flows to the pipe connected to the second coupling member 14. The inner and outer cylindrical walls 56 and 58 are separated by a plurality of annular sealing surfaces 62, 64, 66 and 68. The sealing surfaces 62-68 extend rearwardly from the inner cylindrical wall 56 to the outer cylindrical wall 58. The sealing surface 68 extends to the externally threaded portion 28 on the outer cylindrical wall 58.

Preferably, the sealing surfaces 62, 64, and 68 extend rearwardly from the end portion 18 toward the threaded portion 28 at a preselected angle from a horizontal tangent line to the cylindrical wall 56. The sealing surface 66 connects inclined sealing surfaces 64 and 68 and extends parallel to the inner and outer cylindrical walls 56 and 58. However, all of the sealing surfaces 62-68 are annular and extend around the complete periphery of the coupling end portion 18. With this arrangement, the sealing surfaces 62-68 on the ends 18 of each coupling member 12 and 14 are arranged to sealingly engage the inclined sealing surfaces 50 and 52 on both ends of the annular spacer 40, illustrated in detail in FIG. 3. With reference to FIGS. 3 and 4 it should be understood that they are not drawn to equal scale.

The sealing engagement of the coupling member sealing surfaces 62-68 with the annular spacer inclined sealing surfaces 50 and 52 is illustrated in FIGS. 1 and 5. In operation, the resilient annular spacer 40 is inserted within the recessed portion 32 of the insulating sleeve 20. The outer peripheral sealing surface of the annular spacer 40 formed by the outer cylindrical surface 42 engages the smooth, annular surface 38 of the recessed portion 32. The radial outer sealing surface 54 is positioned in substantially abutting relation with the smooth annular surface 38 adjacent the shoulders 34 and 36 of the recessed portion 32. Each of the coupling members 12 and 14 is threadedly advanced into opposite ends of the insulating sleeve 20 and through the respective threaded portions 30 of the passageway 26.

The coupling member end portions 18 are advanced into the insulating sleeve threaded passageway 26 to an initial position, as illustrated in FIG. 5, where the coupling member sealing surfaces 62-68 are positioned in abutting relation with the complimentary sealing surfaces 50 and 52 of the resilient annular spacer 40. In view of the resilient properties of the spacer 40, the sealing surfaces 50 and 52 are deformable and thereby capable of conforming to the configuration of the coupling member sealing surfaces 62-68. Thus a fluid and pressure tight seal is formed between the complimentary sealing surfaces of the coupling end portions 18 and the annular spacer 40.

As illustrated in FIGS. 1 and 5, the coupling member end portions 18 are threadedly advanced into the insulating sleeve 20 to a point where the sealing surfaces 62-68 extend beyond the internally threaded portions of the insulating sleeve passageway 26 and into underlapping relation with the sealing surfaces 50 and 52 of the annular spacer 40. In this initial sealing position, as illustrated in FIG. 5, the inner cylindrical surface 44 of the spacer 40 is compressed between the coupling member end portions 18. This tends to create a slight bulging of the inner surface 44 of the spacer 40. The annular sealing surfaces 62-68 also expand the ends 46 of the annular spacer 40 radially outwardly into contact with the smooth annular surface 38 of the insulating sleeve 20. The sealing engagement of the spacer outer surface 42 with the annular surface 38 is also facilitated by the fact that the outer diameter of the spacer 40 exceeds the outer diameter of the coupling members 12 and 14. In this manner, a fluid tight seal is established between the coupling member end portions 18 and the insulating sleeve 20.

The operation of the seal illustrated in FIG. 5 is characteristic of the condition where there is no internal fluid pressure within the pipeline and the pipe coupling 10. Additional insertion of the threaded ends 18 of the coupling members 12 and 14 into increased sealing engagement with the annular spacer inner sealing surfaces 50 and 52 urges the surfaces 50 and 52 to be compressed outwardly so that the outer sealing surface 54, as well as, the outer peripheral sealing surface of the spacer 40 sealingly engages the surface 38 of the insulating sleeve 20.

Once the coupling members 12 and 14 are threaded into the opposite ends of the insulating sleeve 20 to the position where all of the internal threads of the sleeve 20 engage all of the external threads of the coupling members 12 and 14 and none of the external threads 28 of members 12 and 14 are exposed, the coupling member end portions 18 are fully extended into the insulating sleeve 20. As a result, the inclined, inner sealing surfaces 50 and 52 of the resilient annular spacer 40 are compressed to conform to the configuration of the coupling member sealing surfaces 62-68 as illustrated in FIG. 1. In addition, the outer sealing surface 54 and the peripheral sealing surface formed by the outer cylindrical surface 42 of the spacer 40 are compressed outwardly into sealing engagement with the insulating sleeve 20. This effects a fluid and pressure tight seal around the annular spacer 40 between the coupling members 12 and 14 and the insulating sleeve 20 and electrically insulates the first and second coupling members 12 and 14 from each other.

Further in accordance with the present invention upon completion of the connection of the pipes of the pipeline by the pipe coupling 10, pressurizing the pipeline exerts an additional outward radial force upon the annular spacer 40 which proportionally increases the sealing engagement of the spacer 40 with the coupling member end portions 18 and the insulating sleeve 20. Particularly, for high pressure pipelines the radial force exerted by the transmission fluid upon the annular spacer 40 supplements the compressive forces exerted by the end portions 18 upon the spacer 40. With this arrangement, the ends 46 of the spacer 40 are securely wedged into complete sealing engagement with the end portions 18, as well as, the insulating sleeve 20. Thus the annular spacer 40 from the inner sealing surfaces 50 and 52 to the outer sealing surface 54 on both ends 46 and the outer cylindrical surface 42 on the periphery of the spacer 40 completely, sealingly engages the adjacent surfaces of the end portions 18 and the insulating sleeve 20. In a pressurized condition of the coupling 10 the slight outward bulge, shown in FIG. 5, of the spacer inner cylindrical surface 44 is removed and the surface 44 moves to the position indicated by the —— —— line, shown in FIG. 5.

As the pressure of the fluid being transmitted through the pipeline and coupling 10 increases, the sealing forces exerted upon the complimentary sealing surfaces of the annular spacer 40 with the end portions 18 and the insulating sleeve 20 increases. With this arrangement, the pipe coupling 10 of the present invention is a self-sealing coupling that increases in sealing efficiency with an increase in the transmission line fluid pressure.

The pipe coupling 10 is completed by the positioning of a reinforcing sleeve 70 over the insulating sleeve 20. The reinforcing sleeve 70 is slid onto the insulating sleeve 20. Preferably, the reinforcing sleeve 70 is a metal sleeve fabricated, for example, from carbon steel tubing and protects the filament-epoxy reinforced insulating sleeve 20 against damage due to impact blows to the coupling 10 which may occur during the life of the coupling 10. The reinforcing sleeve 70 is enveloped in an insulating sheath 72. The insulating sheath 72 is formed in one embodiment by a filament winding reinforced with an epoxy resin. The sheath 72 extends the full length of the reinforcing sleeve 70 and overlaps the adjacent ends of the insulating sleeve 20. With this arrangement, the filament-winding sheath 72 provides a protective insulating and moisture resistant covering around the metal sleeve 70. Also the sheath 72 stabilizes the position of the sleeve 70 on the insulating sleeve 20 by connecting the reinforcing sleeve 70 to the insulating sleeve 20.

According to the provisions of the patent statutes, we have explained the principle, preferred construction, and mode of operation of our invention and have illustrated and described what we now consider to represent its best embodiments. However, it should be understood, that within the scope of the appended claims, the invention may be practiced otherwise than as specifically and described.

We claim:

1. An electrically insulated pipe coupling comprising,
a first coupling member and a second coupling member,
said first and second coupling members being positioned in axial alignment and including oppositely positioned end portions spaced from one another,
said oppositely positioned end portions each having an annular sealing surface,
an insulating sleeve having a bore therethrough for receiving and surrounding said coupling member end portions,
said first and second coupling member end portions being externally threaded and said insulating sleeve being internally threaded to receive and connect said first and second coupling members in spaced relation,
said insulating sleeve having opposite ends and an inner, annular recessed portion,
a resilient annular spacer retained in said insulating sleeve recessed portion between said coupling member end portions, said annular spacer having an outer surface and an inner surface, said outer surface abutting said insulating sleeve, said annular spacer including end portions overlapping said coupling member end portions and positioned oppositely of said insulating inner, annular recessed portion, said annular spacer end portions having a plurality of inclined inner sealing surfaces on said inner surface and an outer sealing surface on said outer surface, said coupling member end portions being axially advanced into the opposite ends of said insulating sleeve so that said annular sealing surfaces thereof are moved into sealing contact with said annular spacer inclined inner sealing surfaces, said annular spacer outer sealing surface being expanded radially outwardly into sealing contact with said insulating sleeve to position said annular spacer end portions in abutting sealing relation with said insulating inner, annular recessed portion to form a fluid tight seal between said coupling member end portions and said insulating sleeve, said annular spacer inner sealing surfaces and said outer sealing surfaces being wedged into sealing contact between said coupling member annular sealing surfaces and said insulating sleeve inner annular recessed portion, a rigid reinforcing sleeve being in contact with and surrounding said insulating sleeve, said rigid reinforcing sleeve being axially fixed on said insulating sleeve, and means completely surrounding said rigid reinforcing sleeve for resisting corrosive damage to said reinforcing sleeve.

2. An electrically insulated pipe coupling as set forth in claim 1 in which,
said rigid reinforcing sleeve is fabricated of metal and said insulating sleeve is fabricated of an electrically nonconductive material.

3. An electrically insulated pipe coupling as set forth in claim 1 in which said means surrounding includes electrically insulating means comprising,
a wound covering fabricated of glass fibers reinforced with a synthetic resin, and
said wound covering overlapping said insulating sleeve.

4. An electrically insulated pipe coupling as set forth in claim 1 in which,
said annular spacer inner sealing surfaces and said outer sealing surfaces being wedged into increased sealing contact with said coupling member annular sealing surfaces and said insulating sleeve inner annular recessed portion upon the application of internal fluid pressure within said first and second coupling members so that the sealing forces applied by said annular spacer upon said coupling member end portions and said insulating sleeve increase with an increase in the internal fluid pressure, and
said coupling member end portions extending into said insulating sleeve and into contact with said annular spacer inner sealing surfaces to further increase the internal pressure upon said annular spacer and axially expand said annular spacer to increase the seal between said coupling members and said insulating sleeve.

5. An electrically insulated pipe coupling as set forth in claim 1 which includes,
the internally threaded portion extending from the end portions of said insulating sleeve to said inner annular recessed portion,
said inner annular recessed portion forming a smooth surface between said internally threaded portions,
said inner annular recessed portion having a diameter greater than the diameter of said internally threaded portions, and
said annular spacer outer surface sealingly engaging said smooth surface and being axially fixed within said inner annular recessed portion.

6. An electrically insulated pipe coupling as set forth in claim 1 in which,
said first and second coupling members include an inner cylindrical wall and an outer cylindrical wall,
said annular sealing surface on each coupling member end portion extending axially between said inner and outer cylindrical walls,
said annular sealing surface being formed by a plurality of annular, angled sealing surfaces,
said annular, angled sealing surfaces extending axially on said respective coupling member end portions a preselected distance, and
said annular angled sealing surfaces being positioned end to end and extending at preselected angles from the horizontal with respect to each other.

7. An electrically insulated pipe coupling as set forth in claim 6 in which,
said annular spacer inclined inner sealing surfaces are engaged by said coupling member annular, angled sealing surfaces upon advancement of said coupling members into said insulating sleeve, and
said annular spacer inclined inner sealing surfaces being deformed by said coupling member annular angled sealing surfaces to conform thereto and thereby form a fluid and pressure tight seal between said annular spacer and said coupling member end portions.

8. An electrically insulated pipe coupling as set forth in claim 1 which includes,
said annular spacer having an outer diameter greater than the outer diameter of said first and second coupling members so that said annular spacer outer surface is maintained compressed in sealing engagement with said insulating sleeve inner annular recessed portion.

9. A method for making an electrically insulated pipe coupling comprising the steps of,
forming an annular sealing surface on the end of a first coupling member and the end of a second coupling member,
retaining a resilient annular spacer having a plurality of inclined, inner sealing surfaces and an outer sealing surface within an insulating sleeve intermediate the end portions of the sleeve,
inserting the ends of the first and second coupling members into opposite ends of the insulating sleeve,
advancing the coupling member annular sealing surfaces into compressing sealing relation with the annular spacer inclined inner sealing surfaces,
expanding the outer sealing surface of the annular spacer radially outwardly into sealing relation with the insulating sleeve to position the end portions of the annular spacer in abutting sealing relation with the insulating sleeve to form a fluid and pressure tight seal around the annular spacer between the first and second coupling members and the insulating sleeve and electrically insulate the first and second coupling members from each other,
externally reinforcing the insulating sleeve, and
completely surrounding the external reinforcing on the insulating sleeve with means to resist corrosive damage thereto.

10. A method for making an electrically insulated pipe coupling as set forth in claim 9 which said advancing includes,
   threadedly advancing the ends of the first and second coupling members into opposite ends of the insulating sleeve and into sealing engagement with the annular spacer inclined inner sealing surfaces.

11. A method for making an electrically insulated pipe coupling as set forth in claim 9 which includes,
   positioning the annular spacer within an annular recessed portion of the insulating sleeve, and
   advancing the first and second coupling member ends into underlying sealing relation with the annular spacer in the insulating sleeve to position the annular spacer between the respective ends and the insulating sleeve to form a seal therebetween.

12. A method for making an electrically insulated pipe coupling as set forth in claim 9 which includes,
   conveying a fluid under pressure through the first and second coupling members,
   applying the fluid pressure to the annular spacer,
   expanding the annular spacer radially outwardly by the fluid pressure,
   urging the inclined, inner sealing surfaces and the outer sealing surface into increased sealing engagement with the coupling member annular sealing surfaces and the insulating sleeve respectively, and
   increasing the sealing forces of the engagement of the annular spacer with the first and second coupling member ends and the insulating sleeve proportionally with an increase in the fluid pressure.

* * * * *